United States Patent [19]

Haas et al.

[11] 3,928,363

[45] Dec. 23, 1975

[54] ALPHA-[P-(1-CYCLOLOWER ALKENYL)-PHENYL]LOWER FATTY ACID-PYRIDYL-LOWER ALKYL ESTERS AND DERIVATIVES

[75] Inventors: Georges Haas, Oberwil; Alfred Sallmann, Bottmingen; Alberto Rossi, Oberwil, all of Switzerland

[73] Assignee: Ciba-Geigy Corporation, Ardsley, N.Y.

[22] Filed: Aug. 6, 1973

[21] Appl. No.: 386,133

[30] Foreign Application Priority Data
Aug. 16, 1972 Switzerland.................. 12129/72

[52] U.S. Cl.... 260/295.5 R; 260/240 J; 260/295 R; 260/294.8 R; 424/263
[51] Int. Cl.[2]....................................... C07D 213/55
[58] Field of Search...... 260/295.5 R, 295 R, 294.8, 260/240 J

[56] References Cited
UNITED STATES PATENTS

| | | | |
|---|---|---|---|
| 3,557,129 | 1/1971 | Karmas........................ | 260/295.5 R |
| 3,786,044 | 1/1974 | Ostermayer.................. | 260/295.5 R |

OTHER PUBLICATIONS
Roberts et al., Basic Principles of Organic Chemistry, Benjamin Publishers, page 806, (1965), QD 251 R 58 C.6.

Primary Examiner—Alan L. Rotman
Attorney, Agent, or Firm—Joseph G. Kolodny; Theodore O. Groeger; John J. Maitner

[57] ABSTRACT

α-Phenyl-fatty acid esters of the formula I

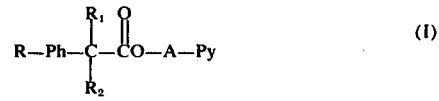

wherein R denotes a 1-cycloalkenyl radical, Ph denotes an o- or p-phenylene radical, $R_1$ and $R_2$ each denote a hydrogen atom or a monovalent aliphatic or araliphatic hydrocarbon radical or together denote a divalent aliphatic or araliphatic hydrocarbon radical, A denotes an alkylene radical or a direct bond and Py denotes a pyridyl radical are useful as antiphlogistics and mild analgesics.

9 Claims, No Drawings

ALPHA-[P-(1-CYCLOLOWER ALKENYL)-PHENYL]LOWER FATTY ACID-PYRIDYL-LOWER ALKYL ESTERS AND DERIVATIVES

The invention relates to new α-phenyl-fatty acid esters of the general formula I

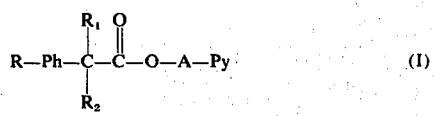

wherein R denotes a 1-cycloalkenyl radical, Ph denotes an ortho-phenylene radical or, especially, a para-phenylene radical, $R_1$ and $R_2$ each denote a hydrogen atom or a monovalent aliphatic or araliphatic hydrocarbon radical or together denote a divalent aliphatic or araliphatic hydrocarbon radical, A denotes an alkylene radical or a direct bond and Py denotes a pyridyl radical, and processes for their manufacture.

The 1-cycloalkenyl radicals R can be unsubstituted or be monosubstituted or polysubstituted. They are, for example, 1-cycloalkenyl radicals with 4–8, above all 5–7, ring members, such as optionally monosubstituted or polysubstituted 1-cyclobutenyl or 1-cyclooctenyl radicals and especially 1-cyclopentenyl, 1-cyclohexenyl or 1-cycloheptenyl radicals. Examples of possible substituents are aliphatic hydrocarbon radicals, especially those mentioned below, above all lower alkyl radicals, alkoxy, alkenyloxy, hydroxyl or oxo groups, or primary, secondary or tertiary amino groups, suitable substituents being those mentioned below for the carbamyl groups.

The phenylene radicals Ph can be unsubstituted or carry one, two or more substituents. Examples of possible substituents are the following: alkyl radicals, such as lower alkyl radicals, especially those mentioned below, alkoxy radicals, halogen atoms, trifluoromethyl radicals or amino groups or nitro or hydroxyl groups.

Examples of divalent aliphatic hydrocarbon radicals $R_1$ and $R_2$ are alkylidene radicals, such as lower alkylidene radicals, especially methylene or ethylidene radicals.

Examples of possible monovalent aliphatic or araliphatic hydrocarbon radicals $R_1$ and/or $R_2$ are alkyl, alkenyl, alkinyl, aralkyl or aralkenyl radicals, and especially those in which the aliphatic radicals are lower radicals and possess, for example, at most 6 carbon atoms.

Examples of lower alkyl radicals are methyl, ethyl, propyl or isopropyl radicals or straight or branched butyl, pentyl or hexyl radicals bonded in any desired position.

Examples of lower alkenyl radicals are allyl or methallyl radicals.

A lower alkinyl radical is above all a propargyl radical.

Lower aralkyl and aralkenyl radicals are in particular phenyl-lower alkyl and phenyl-lower alkenyl radicals.

As examples of phenyl-lower alkyl radicals there may be mentioned 1- or 2-phenylethyl radicals or benzyl radicals which can be substituted in the phenyl nucleus, for example by lower alkyl or alkoxy radicals, halogen atoms, trifluoromethyl groups or similar radicals.

In the preceding and following text the term lower radicals is used for radicals which contain not more than 7, and especially not more than 4, carbon atoms.

Examples of phenyl-lower alkenyl radicals are 1- or 2-phenylethenyl radicals or cinnamyl radicals, which can be substituted in the phenyl nucleus like the phenyl-lower alkyl radicals.

The alkylene radicals A are straight or branched lower alkylene radicals with 1 to 3 C atoms in the alkylene chain, preferably those with a total of 1 to 4 C atoms, such as 1,3-1,2- or 2,3-butylene, 1,3-isobutylene, 1,1- or 2,2-butylidene or 1,1-isobutylidene or above all 1,3- or 1,2-propylene or especially propylidene, isopropylidene, ethylidene, ethylene or methylene.

The pyridyl radicals Py are linked in the 2-, 3- or 4-position if A represents a direct bond, preferably in the 3- or 4-position, and can carry one, two or more substituents and/or be N-oxidised. Possible substituents are alkyl radicals, such as lower alkyl radicals, especially those mentioned above, or alkoxy radicals, such as lower alkoxy radicals, especially those mentioned below.

Alkoxy radicals are above all lower alkoxy radicals, for example methoxy, ethoxy, propoxy, isopropoxy, butoxy or amyloxy groups, and possible halogen atoms are above all fluorine, chlorine or bromine atoms.

The new compounds possess valuable pharmacological properties, above all an analgesic and anti-nociceptice action and an anti-inflammatory action. Thus, on oral administration they show a distinct anti-nociceptive action in the writhing test in mice and on oral administration they show a distinct anti-inflammatory action in the kaolin oedema test on the paws of rats.

The new compounds are useful as antiphlogistics and as mild analgesics. They are however also valuable intermediate products for the manufacture of other useful substances, especially of pharmacologically active compounds.

Thus, for example, the new compounds can be used for the manufacture of the corresponding cycloalkyl compounds already described in the literature by reducing the 1-cycloalkenyl radicals to cycloalkyl radicals in the usual manner, for example by catalytic reduction.

Compounds to be particularly singled out are those of the general formula II

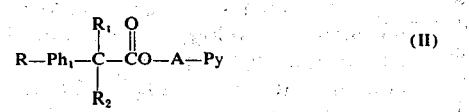

wherein R, A and Py have the abovementioned meanings, $R_1$ and $R_2$ each denote a hydrogen atom or an alkyl, alkenyl, alkinyl, aralkyl or aralkenyl radical or together denote an alkylidene radical and $Ph_1$ denotes an ortho-phenylene radical or above all a para-phenylene radical which is substituted by one or more alkyl or alkoxy radicals, halogen atoms and/or trifluoromethyl radicals or above all is unsubstituted.

Compounds of particular importance are those of the general formula III

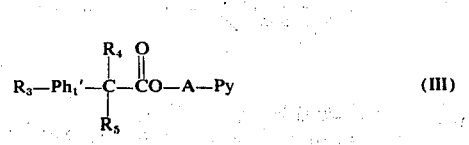

wherein A and Py have the abovementioned meanings, $Ph_1'$ represents a p-phenylene radical which is optionally substituted as indicated above, R₃ represents a 1-cycloalkenyl radical which is substituted by one or more lower alkyl, lower alkenyl or phenyl radicals or above all is unsubstituted, and R₄ and/or R₅ each denote a hydrogen atom or above all an alkyl or alkenyl radical.

Compounds to be particularly singled out because of their good anti-inflammatory and analgesic (antinociceptive) action are the compounds of the formula IV

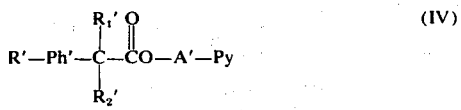

wherein Py has the indicated meaning, R' denotes a 1-cycloalkenyl radical with 5, 6 or 7 ring members which is substituted by lower alkoxy groups and/or especially by lower alkyl groups or is preferably unsubstituted, Ph' denotes a p-phenylene radical which is substituted by a trifluoromethyl group, lower alkoxy group, lower alkyl group or halogen atom or is preferably unsubstituted, $R_1'$ and $R_2'$ denote lower alkyl radicals or hydrogen atoms and A' denotes a lower alkylene radical with 1 to 4 C atoms and 1 to 3 C atoms in the alkylene chain, or denotes a direct bond.

Amongst the compounds of the formula IV, those wherein R', Ph', $R_1'$ and $R_2'$ have the abovementioned meanings, A' represents 1,3- or 1,2-propylene, propylidene, isopropylidene, ethylidene, ethylene or methylene or a direct bond A'' (sic) and Py represents a pyridyl radical Py' which is optionally substituted by one or two lower alkyl and/or alkoxy groups and/or is N-oxidised, should be singled out particularly.

Compounds of particular importance are those of the formula V

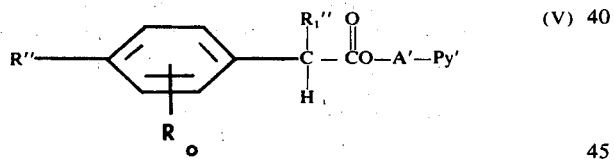

wherein R'' denotes an optionally lower-alkylated 1-cyclopentenyl, 1-cyclohexenyl or 1-cycloheptenyl radical, $R_o$ denotes halogen which is in particular in the o-position to R'', lower alkyl or above all hydrogen, $R_1''$ denotes a lower alkyl radical, above all a methyl radical, or a hydrogen atom, A' denotes a lower alkylene radical with 1 to 4 C atoms and 1 to 3 C atoms in the alkylene chain, or a direct bond, and Py' denotes a pyridyl radical which is optionally substituted by one or two lower alkyl and/or lower alkoxy groups and/or is N-oxidised.

Amongst the compounds of the formula V, very particular importance attaches to those of the formula

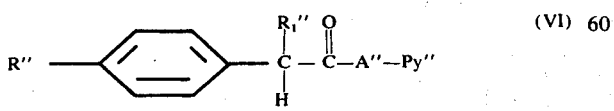

wherein R'' and $R_1''$ have the abovementioned meaning, A'' represents 1,3- or 1,2-propylene, propylidene, isopropylidene, ethylidene, ethylene or above all methylene, or a direct bond, and Py'' denotes a pyridyl radical which is substituted by a lower alkyl or alkoxy group or, above all, denotes an unsubstituted pyridyl radical, in particular α-[4-(1-cyclohexenyl)-3-methoxy-phenyl]-propionic acid (4-pyridyl)-methyl ester and its hydrochloride, α-[p-(1-cyclohexenyl)-phenyl]-propionic acid (2-pyridyl)-methyl ester, α-[p-(1-cycloheptenyl)-phenyl]-propionic acid (2-pyridyl)-methyl ester, α-[p-(1-cyclohexenyl)-phenyl]-propionic acid (3-pyridyl)-methyl ester, α-[p-(1-cyclohexenyl)-phenyl]-propionic acid (2-pyridyl)-ethyl ester, α-[p-(1-cyclohexenyl)-phenyl]-propionic acid (4-pyridyl)-methyl ester, α-[p-(1-cyclohexenyl)-phenyl]-propionic acid 3-(2-pyridyl)-propyl ester, α-[p-(1-cyclohexenyl)-phenyl]-propionic acid 3-pyridyl ester and α-[p-cyclohexenyl)-phenyl]-propionic acid 4-pyridyl ester, which, for example, on oral administration in a dose of 10 to 100 mg/kg display a strong anti-nociceptive action in the writhing test (phenyl-p-quinone) in mice and on oral administration in a dose of 0.3 to 10 mg/kg display a strong anti-inflammatory action in the kaolin paw oedema test in rats.

The process according to the invention for the manufacture of the new compounds is characterised in that in a compound of the formula VII

wherein R, Ph, $R_1$ and $R_2$ have the indicated meanings and Y denotes a radical which can be converted into a group of the formula —COOAPy, Y is converted into the said group.

The radical Y is, for example, the nitrile group which can be solvolysed to the —COOAPy group in the usual manner, for example by reaction with an appropriate alcohol of the formula HO—A—Py, wherein A and Py have the indicated meanings, in the presence of an acid catalyst, for example a mineral acid, such as sulphuric acid, or advantageously in the presence of ammonium chloride, and simultaneous or, preferably, subsequent hydrolysis of the iminoester or iminoester salt formed.

However, Y can also be a free carboxyl group or a carboxyl group which is functionally modified and contains an oxo group, with the exception of a group of the formula —COOAPy, such as an acid ester group which differs from the group of the formula —COOAPy or an acid halide group, such as an acid chloride group, an acid anhydride group (for example also a ketene group) or an acid azide group, which can be converted into the group of the formula —COOAPy, for example by reaction with an alcohol of the formula HO—A—Py, wherein A and Py have the indicated meanings. The reaction is carried out in the usual manner, if desired in the presence of acid-binding agents, such as organic or inorganic bases, or optionally in the presence of catalysts, optionally in an acid or neutral medium.

Free carboxyl groups Y can be esterified in the usual manner, for example by reaction with an appropriate alcohol of the formula HO—A—Py, wherein A and Py have the indicated meanings, advantageously in the presence of an acid, such as a mineral acid, for example sulphuric acid or hydrochloric acid, or in the presence of a water-binding agent, such a dicyclohexylcarbodiimide. The esterification can also be carried out by reaction of a salt of the acid, for example the sodium salt, with a reactive ester of an alcohol of the formula HO—APy, for example a halide thereof, such as the chloride thereof. Free carboxyl groups Y can furthermore be esterified by reaction with a reactive functional derivative of an alcohol of the formula HO—A—Py, for example an acetal thereof.

In resulting compounds, substituents can be introduced, modified or split off within the scope of the end products.

Thus it is possible, for example, to introduce substituents $R_1$ and/or $R_2$ into resulting compounds wherein $R_1$ and/or $R_2$ denote hydrogen atoms. For example, a corresponding compound, above all an ester or an amide, can be converted into the $\alpha$-metal salt, for example by reaction with strong bases, such as alkali metal amides, alkali metal hydrides or alkali metal hydrocarbon compounds, such as sodium amide, sodium hydride or phenyl-lithium or butyl-lithium, and this salt can then, preferably without being isolated, be reacted with a reactive ester of a corresponding alcohol, for example an alcohol of the formula $R_1OH$ or $R_2OH$. Reactive esters are, in particular, esters with strong inorganic or organic acids, preferably with hydrogen halide acids, such as hydrochloric acid, hydrobromic acid or hydriodic acid, with sulphuric acid or with arylsulphonic acids, such as benzenesulphonic acid, p-bromobenzenesulphonic acid or p-toluenesulphonic acid.

Resulting compounds in which the radical Py is not oxidised at the N atom can be N-oxidised. The oxidation is carried out in the usual manner, for example with N-oxidising agents, such as hydrogen peroxide, ozone, inorganic per-acids, for example persulphuric acids, such as Caro's acid, or, in particular, organic peroxy compounds, above all organic peracids, such as peracetic acid, trifluoroperacetic acid, perbenzoic acid or monoperphthalic acid, which can also be substituted, for example by halogen atoms, such as chlorine atoms, for example chloromonoperphthalic acid or m-chloroperbenzoic acid, or tertiary-hydroperoxide compounds, such as tert.-butyl peroxide or cumene peroxide, optionally in the presence of catalysts, such as vanadium, titanium or molybdenum compounds.

In resulting compounds in which the radical Py is N-oxidised, Py can be converted into the corresponding pyridyl group which is not oxidised at the N-atom, in a manner which is in itself known, for example by reduction. The reduction can be carried out with catalytically activated hydrogen, for example hydrogen activated with a transition metal catalyst, such as a nickel, palladium or platinum catalyst, preferably in a solvent, such as in a lower alkanol, for example methanol or ethanol. It is however also possible to use chemical reducing agents, for example complex hydrides of boron or of aluminium, such as lithium aluminium hydride, preferably in an ether-like liquid, such as in a di-lower alkyl ether, for example diethyl ether, and also sulphur or its derivatives in a low level of oxidation, for example sodium dithionite or sulphur dioxide.

In resulting compounds which contain free hydroxyl groups on an aromatic radical, these groups can be etherified. The etherification is carried out in the usual manner, for example by reaction with a reactive ester of an alkanol, preferably in the presence of a strong base.

In resulting compounds which contain nitro groups on aromatic radicals, these groups can be reduced to amino groups, for example with iron and hydrochloric acid.

Depending on the process conditions and starting substances, end products which are capable of forming salts are obtained in the free form or in the form of their salts, which can be converted in the usual manner into one another or into other salts. Thus, acid end products, that is to say end products in which a phenolic hydroxyl group is present, are obtained in the free form or in the form of their salts with bases. The resulting free acid compounds can be converted in the usual manner, for example by reaction with appropriate basic agents, into the salts with bases, above all into therapeutically usable salts with bases, for example salts with organic amines, or metal salts. Possible metal salts are above all alkali metal salts or alkaline earth metal salts, such as sodium, potassium, magnesium or calcium salts. Free acids can be liberated from the salts in the usual manner, for example by reaction with acid agents. End products having a basic character can also be obtained in the free form or in the form of their salts. The salts of the basic end product can be converted into the free bases in a manner which is in itself known, for example with alkalis or ion exchangers. Salts can be obtained from the free bases by reaction with organic or inorganic acids, especially those suitable for the formation of therapeutically usable salts. As examples of such acids there may be mentioned: Hydrogen halide acids, sulphuric acids, phosphoric acids, nitric acid and perchloric acid; aliphatic, alicyclic, aromatic or heterocyclic carboxylic acids or sulphonic acids, such as formic acid, acetic acid, propionic acid, succinic acid, glycollic acid, lactic acid, malic acid, tartaric acid, citric acid, ascorbic acid, maleic acid, hydroxymaleic acid or pyruvic acid; phenylacetic acid, benzoic acid, p-aminobenzoic acid, anthranilic acid, p-hydroxybenzoic acid, salicylic acid or p-aminosalicylic acid, embonic acid, methanesulphonic acid, ethanesulphonic acid, hydroxyethanesulphonic acid and ethylenesulphonic acid; halogenobenzenesulphonic acids, toluenesulphonic acids, naphthalenesulphonic acids or sulphanilic acid; methionine or tryptophane, lysine or arginine.

The salts can also be used to purify the new compounds, for example by converting the free compounds into their salts, isolating these and reconverting them into the free compounds. Because of the close relationships between the new compounds in the free form and in the form of their salts, the free compounds are to be understood, in the preceding and following text, where appropriate also to include the corresponding salts, in respect of general sense and intended use.

Depending on the choice of starting substances and procedures, and depending on the number of asymmetrical carbon atoms, the new compounds can be in the form of optical antipodes, racemates or isomer mixtures (for example racemate mixtures).

Resulting isomer mixtures (racemate mixtures) can be separated into the two stereoisomeric (diastereomeric) pure isomers (for example racemates) in a known manner on the basis of the physico-chemical differences of the constituents, for example by chromatography and/or fractional crystallisation.

Resulting racemates can be resolved into the diastereomers according to known methods, for example by recrystallisation from an optically active solvent, with the aid of micro-organisms or by reaction of a free carboxylic acid with an optically active base which forms salts with the racemic compound and separation of the salts obtained in this manner, for example on the basis of their different solubilities, and the antipodes can be liberated from the diastereomers by the action of suitable agents. A particularly customary optically active base is, for example, the D- and L-form of cinchonine. Advantageously, the more active of the two antipodes is isolated.

Resulting racemates of basic compounds can furthermore be resolved into the diastereomers by reaction with an optically active acid which forms salts with the racemic compound and separation of the salts obtained in this manner, for example on the basis of their different solubilities, and the antipodes can be liberated from the diastereomers by the action of suitable agents. Examples of particularly customary optically active acids are the D- and L-forms of tartaric acid, di-o-toluyltartaric acid, malic acid, mandelic acid, camphorsulphonic acid or quinic acid.

The invention also relates to those embodiments of the process in which a compound obtainable as an intermediate product at any stage of the process is used as the starting compound and the missing process steps are carried out, or in which the process is stopped at any stage, or in which a starting substance is formed under the reaction conditions or in which a reactant is optionally present in the form of its salt.

Thus, the new compounds in which $R_1$ and/or $R_2$ represent hydrogen can furthermore be obtained if a corresponding diazoketone is reacted, for example according to the Arndt-Eistert method, with an alcohol of the formula HO—A—Py, wherein A and Py have the indicated meanings, under suitable conditions. In this reaction, compounds corresponding to the formula VII, wherein Y together with one of the radicals $R_1$ or $R_2$ denotes a ketene group, are formed transiently and these then react further as indicated. Preferably, a diazoketone of the formula $$R-Ph-\overset{O}{\underset{\|}{C}}-\overset{\ominus}{C}H-N\overset{\oplus}{\equiv}N,$$

wherein R and Ph have the indicated meanings, is reacted in the presence of a catalyst, such as a metal catalyst, in particular colloidal silver, and at elevated temperature. The reaction can however also be carried out in an alcoholic solution and also in an aqueous or ammoniacal medium (or a medium rendered basic with an amine), especially at elevated temperature.

Appropriately, those starting substances are used for carrying out the reactions according to the invention which lead to the groups of end products which were particularly mentioned initially, and in particular to the end products which have been specially described or singled out.

The starting compounds are known or can, if they are new, be manufactured according to methods which are in themselves known.

The acids of the formula

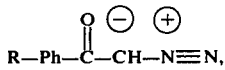

used as preferred starting substances can be obtained, for example, when a compound of the formula

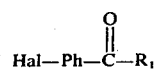

wherein Hal denotes a halogen atom, such as a chlorine or bromine atom, is converted into a corresponding ketal or acetal, for example an ethylene ketal, the resulting compound is converted with magnesium into the corresponding Grignard reagent and this is reacted with an appropriate cycloalkanone. In the [1-hydroxy-cycloalkyl] compound thus obtained, the hydroxyl group is split off, advantageously in the presence of acid, to form a 1,2-double bond, and in the compound of the formula

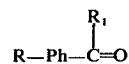

thus obtained the oxo group is reduced to the hydroxyl group in the usual manner. The hydroxyl group is then converted in the usual manner, for example by reaction with halides of phosphorus or sulphur, such as phosphorus oxychloride or thionyl chloride or similar bromides, into an appropriate halogen atom, which can then be converted by reaction with a salt of hydrocyanic acid, such as sodium cyanide, into the nitrile group, which can then be hydrolysed in the usual manner to the free carboxyl group Y and/or be converted into another of the groups Y which have been mentioned. Compounds in which $R_2$ does not denote hydrogen can be obtained by introducing the radical $R_2$, for example into the nitrile, for example in a similar manner to that described above for the esters, via the $\alpha$-metal salt and reaction with a reactive ester of an alcohol of the formula $R_2$—OH.

The new compounds can be used, for example, in the form of pharmaceutical preparations in which they are present in the free form or, if appropriate, in the form of their salts, especially of the therapeutically usable alkali metal salts, mixed with a pharmaceutical, organic or inorganic solid or liquid excipient which is suitable, for example for enteral, parenteral or topical administration. Suitable substances for forming the excipient are those which do not react with the new compounds, such as, for example, water, gelatine, lactose, starch, stearyl alcohol, magnesium stearate, talc, vegetable oils, benzyl alcohols, gum, propylene glycols, white petroleum jelly or other known medicinal excipients. The pharmaceutical preparations can, for example, be in the form of tablets, dragées, capsules, suppositories, creams or ointments or in a liquid form as solutions (for example as an elixir or syrup), suspensions or emulsions. They are optionally sterilised and/or contain auxiliaries, such as preservatives, stabilisers, wetting agents or emulsifiers, solubilising agents or salts for regulating the osmotic pressure, or buffers. They can also contain other therapeutically valuable substances. The pharmaceutical preparations are obtained according to customary methods.

The approximate daily dose to be recommended for a warm-blooded animal weighing about 75 kg is 50–200 mg.

The invention is described in more detail in the examples which follow.

EXAMPLE 1

A solution of 13 g of α-[p-(1-cyclohexenyl)-phenyl]- propionyl chloride in 30 ml of absolute tetrahydrofurane is slowly added dropwise to a solution of 7 g of α-picolyl alcohol and 10.5 g of triethylamine in 100 ml of absolute tetrahydrofurane at −10°C, whilst stirring and excluding water. Thereafter the mixture is stirred for a further hour at −10°C and for 8 hours at room temperature. The reaction mixture is then poured onto 500 g of ice and is extracted with 3 times 500 ml of ether. The organic phases are washed with 500 ml of saturated sodium bicarbonate solution and 500 ml of water, whilst cooling with ice, dried over sodium sulphate and evaporated to dryness in vacuo. The evaporation residue is filtered through a short column of 200 g of silica gel, using ether as the eluant. The evaporation residue from the chromatography fractions is distilled in a high vacuum. The fraction boiling at 180°C and 0.05 mm Hg consists of α-[p-(1-cyclohexenyl)-phenyl]-propionic acid (2-pyridyl)-methyl ester of the formula

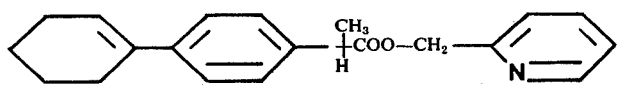

EXAMPLE 2

In an analogous manner to that described in Example 1, α-[p-(1-cyclohexenyl)-phenyl]-propionic acid 3-(2-pyridyl)propyl ester of the formula

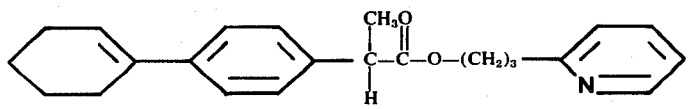

can be manufactured by reaction of α-[p-(1-cyclohexenyl)-phenyl]-propionyl chloride with 3-(2-pyridyl)-propanol; mass spectrum: M+ at e/m = 349, IR absorption spectrum (in $CH_2Cl_2$): $\nu_{CO}$ at 1,720 cm$^{-1}$.

EXAMPLE 3

In an analogous manner to that described in Example 1, α-[p-(1-cycloheptenyl)-phenyl]-propionic acid (2-pyridyl) methyl ester of the formula

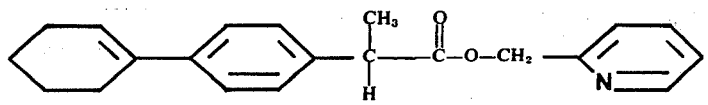

can be manufactured by reaction of α-[p-(1-cycloheptenyl)-phenyl]-propionyl chloride with α-picolyl alcohol; boiling point$_{0.03}$=170°C.

α-[p-(1-Cycloheptenyl)-phenyl]-propionyl chloride, used as the starting material, can be obtained as follows.

27 ml of oxalyl chloride are added in portions, whilst stirring and excluding water, to a suspension of 16 g of the dry sodium salt of α-[p-(1-cycloheptenyl)-phenyl]-propionic acid in 130 ml of absolute benzene. The mixture is then stirred for a further hour at 0°C and overnight at room temperature. It is now evaporated to dryness in vacuo. 200 ml of absolute benzene are added to the residue, the sodium chloride is filtered off and filtrate is evaporated to dryness in vacuo. The evaporation residue contains crude α-[p-(1-cycloheptenyl)-phenyl]-propionyl chloride, which is directly processed further, without additional purification.

EXAMPLE 4

In an analogous manner to that described in Example 1, α-[p-(1-cyclohexenyl)-phenyl]-propionic acid (4-pyridyl)methyl ester of the formula

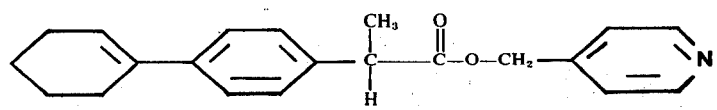

can be manufactured by reaction of α-[p-(1-cyclohexenyl)-phenyl]-propionyl chloride with γ-picolyl alcohol; melting point 62–63°C.

EXAMPLE 5

In an analogous manner to that described in Example 1, α-[p-(1-cyclohexenyl)-phenyl]-propionic acid 2-(2-pyridyl)-ethyl ester of the formula

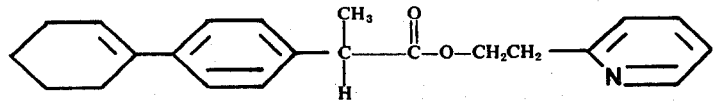

can be manufactured by reaction of α-[p-(1-cyclohexenyl)-phenyl]-propionyl chloride with 2-(2-pyridyl)-ethanol; IR absorption spectrum (in $CH_2Cl_2$): $\nu_{CO}$=1,730 cm$^{-1}$.

EXAMPLE 6

In an analogous manner to that described in Example

1, α-[p-(1-cyclohexenyl)-phenyl]-propionic acid (3-pyridyl)-methyl ester of the formula

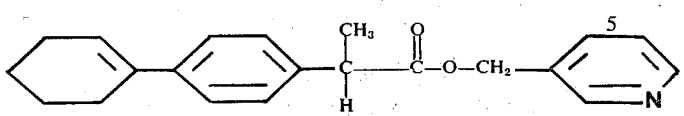

can be manufactured by reaction of α-[p-(1-cyclohexenyl)-phenyl]-propionyl chloride with β-picolyl alcohol; boiling point$_{0.15}$= 220°C.

EXAMPLE 7

In an analogous manner to that described in Example 1, α-[4-(1-cyclohexenyl)-3-methoxy-phenyl]-propionic acid (4-pyridyl)-methyl ester hydrochloride of the formula

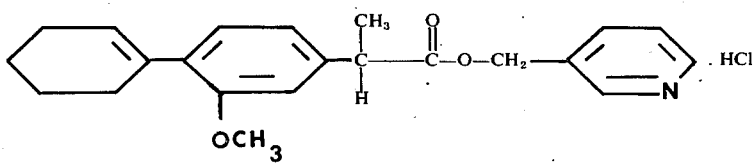

of melting point 179°–180°C (from ethanol/diethyl ether) can be manufactured by reaction of α-[4-(1-cyclohexenyl)-3-methoxyphenyl]-propionyl chloride with γ-picolyl alcohol, chromatographic purification of the resulting crude product on a 50-fold amount of silica gel, using diethyl ether as the eluant, and conversion of the chromatographically pure ester thus obtained into the hydrochloride by reaction with the equimolecular amount of ethanolic hydrochloric acid.

EXAMPLE 8

Tablets containing 40 mg of the sodium salt of α-[p-(1-cyclohexenyl)-phenyl]-propionic acid (4-pyridyl)-methyl ester can, for example, be manufactured to have the following composition:

| Composition | Per tablet |
| --- | --- |
| Active substance | 40.0 mg |
| Wheat starch | 90.0 mg. |
| Lactose | 120.0 mg |
| Colloidal silica | 10.0 mg |
| Talc | 18.0 mg |
| Magnesium stearate | 2.0 mg |
| | 280.0 mg |

Manufacture

The active substance is mixed with a part of the wheat starch, with lactose and with colloidal silica and the mixture is forced through a sieve. A further part of the wheat starch is worked to a paste with a 5-fold amount of water on a water bath and the powder mixture is kneaded with this paste until until a slightly plastic mass has been produced.

The plastic mass is forced through a sieve of approx. 3 mm mesh width and dried, and the dry granules are forced through a sieve. The remaining wheat starch, talc and magnesium stearate are then mixed in. The resulting mixture is pressed to give tablets weighing 280 mg.

We claim:
1. α-Phenyl fatty acid esters of the formula

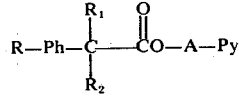

wherein R denotes unsubstituted 5, 6 or 7 ring membered 1-cycloalkenyl, or such radical mone-substituted by lower alkyl or lower alkoxy, Ph denotes unsubstituted o- or p-phenylene, or such radical mono-substituted by lower alkyl, lower alkoxy, halogen or trifluoromethyl, $R_1$ and $R_2$ each denote independently hydrogen, lower alkyl, allyl or methallyl, or together denote lower alkylidene, A denotes straight or branched lower 1,1- 1,2- or 1,3-alkylene or a direct bond and Py denotes unsubstituted pyridyl or such radical mono-substituted by lower alkyl or lower alkoxy, wherein "lower" denotes said radicals with at most 4 carbon atoms, or therapeutically acceptable acid addition salts thereof.

2. α-Phenyl-fatty acid esters of the formula

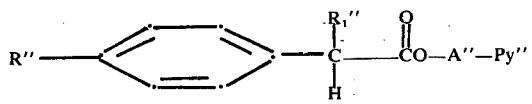

wherein R'' denotes 1-cyclopentenyl, 1-cyclohexenyl or 1-cycloheptenyl, $R_1''$ denotes straight alkyl with 1 to 4 C atoms, A'' denotes 1,3- propylene, ethylene or methylene, and Py'' denotes unsubstituted pyridyl, or therapeutically acceptable acid addition salts thereof.

3. α-[p-(1-Cyclohexenyl)-phenyl]-propionic acid (2-pyridyl)-methyl ester.

4. α-[p-(1-Cycloheptenyl)-phenyl]-propionic acid (2-pyridyl)-methyl ester.

5. α-[p-(1-Cyclohexenyl)-phenyl]-propionic acid (3-pyridyl)-methyl ester.

6. α-[p-(1Cyclohexenyl)-phenyl]-propionic acid 2-(2-pyridyl)-ethyl ester.

7. α-[p-(1-Cyclohexenyl)-phenyl]-propionic acid (4-pyridyl)-methyl ester.

8. α-[p-(1-Cyclohexenyl)-phenyl]-propionic acid 3-(2-pyridyl)-propyl ester.

9. α-[4-(1-Cyclohexenyl)-3-methoxy-phenyl]-propionic acid (4-pyridyl)-methyl ester.

* * * * *